US008932528B2

United States Patent
Blücher et al.

(10) Patent No.: US 8,932,528 B2
(45) Date of Patent: Jan. 13, 2015

(54) INSTALLATION AND METHOD FOR PRODUCING ACTIVE CARBON

(75) Inventors: Hasso von Blücher, Erkrath (DE); Raik Schönfeld, Hannover (DE)

(73) Assignee: Blücher GmbH, Erkrath (DE)

( * ) Notice: Subject to any disclaimer, the term of this patent is extended or adjusted under 35 U.S.C. 154(b) by 350 days.

(21) Appl. No.: 13/383,005

(22) PCT Filed: Oct. 6, 2009

(86) PCT No.: PCT/EP2009/007172
§ 371 (c)(1),
(2), (4) Date: Mar. 28, 2012

(87) PCT Pub. No.: WO2011/003434
PCT Pub. Date: Jan. 13, 2011

(65) Prior Publication Data
US 2012/0177563 A1    Jul. 12, 2012

(30) Foreign Application Priority Data
Jul. 10, 2009  (DE) .................. 10 2009 032 810

(51) Int. Cl.
| B01J 19/00 | (2006.01) |
| B01J 19/28 | (2006.01) |
| F27B 7/06 | (2006.01) |
| B01J 20/20 | (2006.01) |

(Continued)

(52) U.S. Cl.
CPC . *F27B 7/06* (2013.01); *B01J 20/20* (2013.01); *C01B 31/088* (2013.01); *C01B 31/10* (2013.01); *F27B 7/00* (2013.01)
USPC ........... 422/168; 422/600; 422/630; 422/643; 422/198; 422/209

(58) Field of Classification Search
None
See application file for complete search history.

(56) References Cited

U.S. PATENT DOCUMENTS 3,940,344 A  *  2/1976  Yokogawa et al. ........... 502/426
4,115,317 A       9/1978  Spater (Continued)

FOREIGN PATENT DOCUMENTS

GB    1001161 A  *  8/1965
JP    05345605 A  *  12/1993

(Continued)

OTHER PUBLICATIONS

English abstract and machine translation for JP 05-345605 A (Dec. 1993).*

*Primary Examiner* — Jennifer A Leung

(57) ABSTRACT

The Invention relates to an apparatus or installation for producing active carbon, in particular by carbonization and subsequent activation of polymeric, organic, preferably sulphonated, starting materials, wherein the apparatus or installation comprises optionally a drying device for drying the starting materials, optionally a sulphonating device, arranged downstream of the optionally present drying device, for sulphonating and/or peptizing the optionally previously dried starting materials, a carbonizing device, arranged downstream of the optionally present drying device and/or the optionally present sulphonating device, for carbonizing the optionally previously dried and/or sulphonated and/or peptized starting materials, as well as an activating device, arranged downstream of the carbonizing device, for activating the starting materials previously carbonized in the carbonizing device, wherein the apparatus or installation also comprises at least one exhaust-gas treatment device for treating the exhaust gases formed in the carbonizing device and/or in the activating device during operation.

11 Claims, 1 Drawing Sheet

(51) Int. Cl.
*C01B 31/08* (2006.01)
*F27B 7/00* (2006.01)
*C01B 31/10* (2006.01)

(56) References Cited

U.S. PATENT DOCUMENTS 4,139,416 A * 2/1979 Palumbo et al. .......... 201/8
4,439,209 A * 3/1984 Wilwerding et al. .......... 48/76
5,670,024 A * 9/1997 Baltzer et al. .......... 201/25
2007/0254807 A1 11/2007 Bisque et al.
2009/0142252 A1 6/2009 Nagata et al.

FOREIGN PATENT DOCUMENTS

| WO | WO-2005016819 | 2/2005 |
| WO | WO-2007119698 | 10/2007 |

* cited by examiner

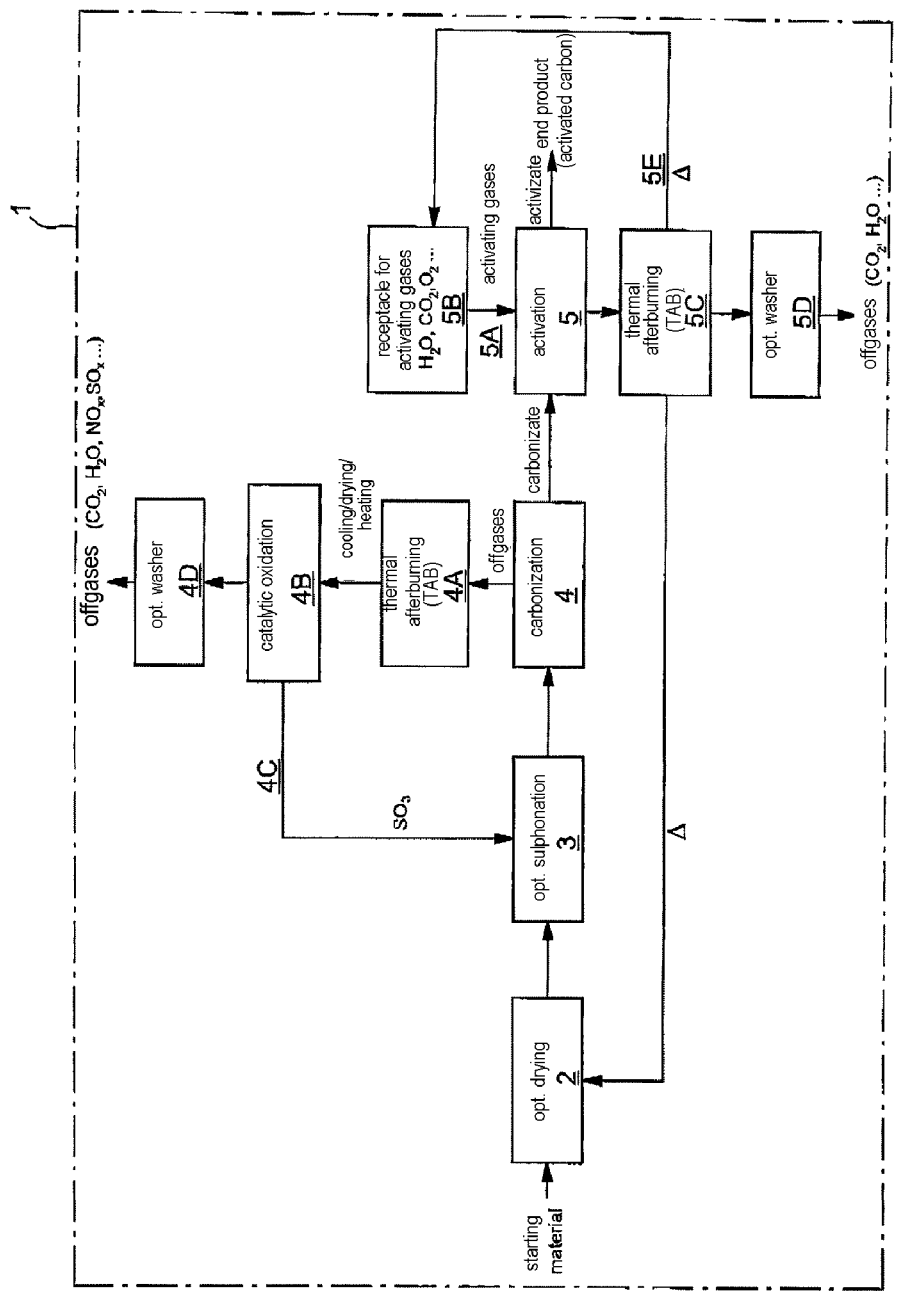

INSTALLATION AND METHOD FOR PRODUCING ACTIVE CARBON

CROSS-REFERENCES TO RELATED APPLICATIONS

This application is a National Stage filing of International Application PCT/EP 2009/007172, filed Oct. 6, 2009, claiming priority to German Application No. DE 10 2009 032 810.6 filed Jul. 10, 2009, entitled "INSTALLATION AND METHOD FOR PRODUCING ACTIVE CARBON." The subject application claims priority to PCT/EP 2009/007172, and to German Application No. DE 10 2009 032 810.6, and incorporates all by reference herein, in their entirety.

BACKGROUND OF THE INVENTION

The present invention relates to the technical field of producing activated carbon.

The present invention relates more particularly to an apparatus and also a process for producing activated carbon, in particular by carbonization and subsequent activation of suitable polymeric starting materials, such as sulphonated polymers.

Activated carbon has highly non-specific adsorption properties and for this reason is the most widely used absorbent. Statutory requirements as well increasing environmental awareness are leading to an increasing demand for activated carbon.

Activated carbon is generally produced by carbonization and subsequent activation of suitable carbonaceous starting materials. Starting materials which lead to economically viable yields are generally preferred, since the weight losses caused by detachment of volatile constituents during carbonization and by burn-out during activation are appreciable. For further details concerning the production of activated carbon, see for example H. v. Kienle and E. Bäder, Aktiv-kohle und ihre industrielle Anwendung, Enke Verlag Stuttgart, 1980.

Carbonization, also known as pyrolysis, describes the conversion of the carbonaceous starting material into carbon. The process of carbonizing the aforementioned polymeric, in particular sulphonated, organic starting materials has the effect of detaching volatile constituents such as $SO_2$ in particular to destroy the functional chemical groups, sulphonic acid groups in particular, to form free radicals which effect the pronounced crosslinking without which there would be no pyrolysis residue (=carbon).

Carbonization is followed by activation. The basic principle of activation consists in some of the carbon generated by carbonization being selectively and deliberately broken down under suitable conditions. This gives rise to a large number of pores, cracks and fissures, and the surface area per unit mass increases appreciably. Activation thus involves a deliberate burn-out of the previously carbonized material. Since carbon is broken down during activation, this operation leads to a loss of substance which is appreciable in some instances and which under optimum conditions equates to an increase in the porosity and an increase in the internal surface area and of the pore volume. Activation is therefore effected under selective/controlled, generally oxidizing, conditions.

The condition or constitution of the activated carbon produced—finely or coarsely porous, firm or brittle—is also dependent on the starting material. Customary starting materials are coconut shells, wood wastes, peat, bituminous coal, pitches, but also particular plastics, which play a certain part in the production of woven activated carbon fabrics inter alia.

Various forms of activated carbon are used: carbon powder, splint coal, granulocarbon, moulded carbon and also, since the end of the 1970s, activated carbon in spherical form ("spherocarbon"). Spherical activated carbon has a number of advantages over other forms of activated carbon such as carbon powder, splint coal, granulocarbon and the like, making it valuable or even indispensable for certain applications: it is free-flowing, hugely abrasion-resistant (i.e. dustless) and very hard. Owing to its high price, however, its use is essentially limited to protective suits and high-performance filters for noxiants in air streams.

Spherocarbon is in great demand on account of its specific shape, but also on account of its extremely high abrasion resistance for particular fields of use for example, examples being sheet filters for protective suits against chemical poisons and filters for low noxiant concentrations in large volumes of air. For instance, when reticulated, large-cell polyurethane foams are loaded with activated carbon as described in DE 38 13 563 A1, only a very free-flowing carbon can be used if optimal coverage of the inner layers of the foam material as well as the outer layers is to be achieved. The manufacture of protective suits against chemical poisons on the lines of DE 33 04 349 C3 for example can likewise utilize only a highly abrasion-resistant carbon, and only spherocarbon fits this description.

Spherocarbon is currently still being mostly produced by multistage processes which are very costly and inconvenient. The best-known process consists in spherules being produced from coal tar pitch and suitable asphaltic residues from the petrochemical industry and oxidized (to render them unmeltable), carbonized and activated. For example, spherocarbon can be produced from bitumen in a multistage process. These multistage processes are very cost-intensive and the associated high price of this spherocarbon prevents many applications wherein spherocarbon ought to be preferable by virtue of its properties.

There have consequently been various attempts to produce high-grade spherocarbon in some other way. It is prior art to produce spherocarbon by carbonization and subsequent activation of new or used ion exchangers containing sulphonic acid groups, or by carbonizing ion exchanger precursors in the presence of sulphuric acid and subsequent activation, wherein the sulphonic acid groups and the sulphuric acid respectively have the function of a crosslinker, and the yields obtained, which do not depend on whether ready-produced cation exchangers or unsulphonated ion exchanger precursors are used as starting materials, being about 30% to 50%, based on organic/polymeric starting material. Such processes are described for example in DE 43 28 219 A1 and in DE 43 04 026 A1 and also in DE 196 00 237 A1, including the German patent-of-addition application DE 196 25 069 A1. But these processes are disadvantageous and problematic particularly because of the large amounts of sulphur dioxide released (about 1 kg of $SO_2$ per kg of end product) and also because of the (partly) associated corrosion problems in the manufacturing equipment. When used ion exchanger resins, in particular used cation exchanger resins, are used as starting materials, there is also the problem that these, although they have been washed with acid, are contaminated with cations which then accumulate in the end product, so that the production of major amounts of spherocarbon in consistent quality is consequently very difficult. When ion exchanger precursors, i.e. polymer spherules without exchanger groups like sulphonic acid groups, are used, it is additionally necessary to use large amounts of sulphuric acid and/or oleum for the crosslinking during the carbonization.

WO 98/07655 A1 describes a process for producing spherules of activated carbon wherein a mixture comprising a distillation residue from diisocyanate production and a carbonaceous processing assistant with or without one or more further added substances is processed into free-flowing spherules which are subsequently carbonized and then activated. This process likewise releases, in the course of the carbonizing step, large pulses of decomposition products, which is associated with the problems described above.

Commonly assigned WO 01/83368 A1 relates to an improved process for producing activated carbon wherein the requisite process steps of carbonization on the one hand and activation on the other are carried out separately from each other in that the carbonization is carried out as a continuous operation while the postcarbonization and activation is carried out as a batch operation. This process is mainly based on the separation of the corrosive phase (i.e. precarbonization, associated with $SO_2$ emissions) from the high-temperature phase (activation). This is because precarbonized starting material is no longer corrosive; i.e. corrosive materials/gases are no longer formed when the temperature is raised any further.

Furthermore, the commonly assigned printed publications DE 2004 036 109 A1, DE 10 2005 036 607 A1 and also WO 2005/016819 A1 disclose apparatuses for producing activated carbon.

However, the processes and apparatuses for producing activated carbon which are known from the prior art are usually concerned with improving partial aspects only and do not provide a holistic approach which takes account of all problems arising in activated carbon production, particularly the high energy requirements, the use of cost-intensive starting materials and chemicals, the emission of offgases, the loss of energy in the individual processing stages, and the like.

BRIEF SUMMARY OF THE INVENTION

The problem underlying the present invention therefore consists in providing a novel apparatus and process for producing activated carbon wherein the previously described disadvantages associated with the prior art shall be at least partly avoided or at least ameliorated.

The apparatus and process shall make it possible to produce activated carbon in a less inconvenient, ideally less cost-intensive and also ecologically as well as economically improved or more efficient manner.

To solve the problem described above, the present invention therefore proposes an apparatus for producing activated carbon as described herein, a process for producing activated carbon as described herein and the use of the inventive apparatus as described herein; further, advantageous developments each form subject matter further described herein.

It will be readily understood that particular developments and embodiments which have been described only in connection with one aspect of the present invention also apply mutatis mutandis in relation to the other aspects of the present invention without this being expressly stated.

As for the rest, a person skilled in the art may, for a particular application or on a one-off basis, depart from the hereinbelow recited numbers, values and ranges without thereby going outside the scope of the present invention.

BRIEF DESCRIPTION OF THE DRAWINGS

FIG. 1 provides a schematic depiction of a typical embodiment of the inventive apparatus and the inventive process.

DETAILED DESCRIPTION OF THE INVENTION

The present invention accordingly provides—in accordance with a first aspect of the present invention—an apparatus for producing activated carbon, in particular by carbonization and subsequent activation of polymeric organic, preferably sulphonated, starting materials, the apparatus including optionally a drying means for drying the starting materials, optionally a sulphonating means for sulphonating and/or peptizing the optionally previously dried starting materials, in particular downstream of the optional drying means, a carbonizing means for carbonizing the optionally previously dried and/or sulphonated and/or peptized starting materials, in particular downstream of the optional drying means and/or the optional sulphonating means, downstream of the carbonizing means, an activating means for activating the starting materials previously carbonized in the carbonizing means, wherein the apparatus also comprises at least one offgas-treating means for treating the offgases formed in operation in the carbonizing means and/or in the activating means.

In general, the offgas-treating means comprises at least one thermal afterburning (TAB) stage.

Thermal afterburning (TAB) herein is to be understood as referring to an operation wherein the offgases formed in the carbonization and/or activation are burned at temperatures above 900° C. This operation converts gases in the offgases, in particular hydrocarbons, carbon monoxide and elemental hydrogen, into water and carbon dioxide generally and essentially completely. The remaining offgases are thus less inconveniently and consequently less costly to clean/purify and the resulting heat can be fed back to the carbonization and/or activation process, saving energy.

In a preferred embodiment of the present invention, the apparatus of the present invention comprises at least one offgas-treating means for treating the offgases formed in operation in the carbonizing means on the one hand and at least one offgas-treating means for treating the offgases formed in operation in the activating means, on the other.

The carbonizing means in the apparatus of the present invention can customarily be constructed as follows:

In general, the carbonizing means comprises at least one rotary tube, in particular at least one rotary tube oven.

It will be found advantageous for the carbonizing means to form a closed system and/or be operable under inert conditions.

A closed system for the purposes of the present invention is, in particular, a system which exchanges very little energy with the environment. Similarly, an exchange of matter with the environment, except for the supplied process gases (for example water vapour, carbon dioxide, etc.) and the removed offgases, shall ideally be avoided or at least minimized; thus, any exchange of matter only takes place under precisely defined and policed conditions.

By "inert conditions" herein it is meant, in particular, that the apparatus of the present invention is operated with an inert gas atmosphere and that the process of the present invention is conducted under an inert gas atmosphere, said inert gas atmosphere preferably comprising a noble gas and/or nitrogen atmosphere, more preferably a nitrogen atmosphere. The inert gas atmosphere prevents any unintended excessive oxidation or a burn-out of the material used.

According to the present invention, the carbonizing means may be operable continuously or quasi-continuously. Furthermore, the temperature of the carbonizing means may be continuously or steppedly variable in operation.

In a preferred embodiment of the present invention, the temperature of the carbonizing means is adjustable in operation such that two or more, in particular at least two, preferably four to eight, temperature zones having temperatures which each differ from the others, preferably having the temperature of the individual temperature stages each rising in the downstream direction, are present. Alternatively, however, a temperature gradient may also be present, preferably having a temperature profile which rises in the upstream direction.

A temperature zone for the purposes of the present invention is a heating zone or a region of at least essentially constant temperature. The rise in temperature in the process flow direction via two or more temperature zones occasions a relatively constant emission of sulphur oxides $SO_x$ from the starting material to be carbonized. More particularly, no spikes in sulphur oxide emission, in particular in sulphur dioxide emission, are obtained, so that the means for capturing and treating the offgases can be made smaller than would be possible in the event of spikes occurring in the emission of sulphur oxides. In addition, it is only the continuous and constant release of sulphur oxides, in particular sulphur dioxide, that permits a hereinbelow recycling operation for the sulphur oxides, which would otherwise be impossible to carry out.

The temperature of the carbonizing means in operation can vary between wide limits in the realm of the present invention. The range in which the temperature of the carbonizing means is variable is generally from 20° C. to 1200° C., in particular from 30° C. to 1100° C., preferably 50° C. to 1000° C. It will be found particularly advantageous when a first temperature zone, preferably situated at the inlet or in the process flow direction at the upstream end of the carbonizing means is adjustable in operation in the range from 50° C. to 500° C., in particular 200° C. to 450° C. It may additionally be contemplated that a further temperature zone, preferably situated at the outlet or downstream end of the carbonizing means, be adjustable in operation in the range from 800° C. to 1200° C., in particular 850° C. to 950° C. However, for a particular application or on a one-off basis, it is possible to depart from the aforementioned values without thereby going outside the scope of the present invention. A decision to do so is within the ability or discretion of a person skilled in this field to decide.

In a particularly preferred embodiment of the present invention, the carbonizing means is subdivided into at least two sections. A first section, preferably disposed upstream, may be formed by a heatable vibrating chute and a second section, preferably disposed downstream of the first section, may be formed by a rotary tube, preferably a rotary tube oven, in particular having a rising temperature profile or temperature gradient in the process flow direction in the operating state.

Vibrating chute herein is to be understood as meaning a chute or some other conveying means, such as a conveyor belt for example, which ensures good commixing and uniform heating of the material to be carbonized, by systematic vibration.

In one particular embodiment of the present invention, the first section of the carbonizing means may be constructed to be settable to a constant temperature or may be constructed to be adjustable to a rising temperature profile or temperature gradient in the process flow direction, while the second section may be constructed to be adjustable to a rising temperature profile or temperature gradient in the process flow direction. It will be found advantageous in the realm of the present invention for the temperature in the first section of the carbonizing means in the process flow direction to be continuously or steppedly adjustable.

The temperature in the first section of the carbonizing means in the process flow direction may vary within wide limits. The range in which the temperature in the first section of the carbonizing means in the process flow direction is variable generally extends from 50° C. to 500° C., preferably from 200° C. to 450° C. Nonetheless, for a particular application or on a one-off basis, it is possible to depart from the aforementioned values without thereby going outside the scope of the present invention. A decision to do so is within the ability or discretion of a person skilled in this field to decide.

In an embodiment which is preferred according to the present invention, the temperature in the second section of the carbonizing means in the process flow direction is adjustable to rise, in particular steppedly or steplessly, in the process flow direction. More particularly, the temperature in the second section of the carbonizing means in the process flow direction is adjustable to rise in two or more temperature zones or with a temperature gradient in the process flow direction. The temperature in the second section of the carbonizing means in the process flow direction may vary within wide limits. In general, the temperature in the second section of the carbonizing means in the process flow direction is settable to rise in the range from 300° C. to 1200° C., preferably from 350° C. to 950° C., in the process flow direction. Nonetheless, for a particular application or on a one-off basis, it is possible to depart from the aforementioned values without thereby going outside the scope of the present invention. A decision to do so is within the ability or discretion of a person skilled in this field to decide.

In an again particularly preferred embodiment of the present invention, the carbonizing means includes, preferably at the inlet or in the process flow direction at the upstream end of the carbonizing means, in particular at the inlet or in the process flow direction at the upstream end of the second section of the carbonizing means, an injective spraying or jetting means for injective spraying or jetting of water vapour, in particular in the form of a water vapour-inert gas mixture. The proportion of water vapour in the water vapour-inert gas mixture may vary within wide limits. In general, the proportion of water vapour in the water vapour-inert gas mixture is adjustable in the range from 1% to 30% by volume, in particular 2% to 20% by volume, preferably 5% to 15% by volume. Nonetheless, for a particular application or on a one-off basis, it is possible to depart from the aforementioned values without thereby going outside the scope of the present invention. A decision to do so is within the ability or discretion of a person skilled in this field to decide. It is preferable in the realm of the present invention when the injective spraying or jetting means for injective spraying or jetting of water vapour, in particular in the form of a water vapour-inert gas mixture, is situated in the first third, preferably in the first quarter, of the carbonizing means.

It will further be found to be advantageous in the realm of the present invention when the carbonizing means includes, preferably at the outlet or in the process flow direction at the downstream end of the carbonizing means, an injective jetting means for introducing oxygen, in particular in the form of an oxygen mixture with at least one further gas, preferably in the form of air. The volume stream of the introduced oxygen into the carbonizing means may vary within wide limits. In general, the injected volume stream of oxygen, in particular in the form of an oxygen mixture with at least one further gas, preferably in the form of air, is adjustable in the range from 10 to 500 l/min, in particular 25 to 250 l/min, preferably 50 to 100 l/min. Nonetheless, for a particular application or on a one-off basis, it is possible to depart from the aforementioned values without thereby going outside the scope of the present invention. A decision to do so is within the ability or discretion of a person skilled in this field to decide. It will be found to be particularly advantageous when the injective jetting means for introducing oxygen is situated in the last third, preferably in the last quarter of the reaction sector in the carbonizing means.

The injective jetting or spraying of water vapour and/or oxygen substantially prevents, by oxidation/burning of the pyrolysis gases, any condensing of pyrolysis gases in the base pore system of the activated carbon being formed; secondly, the heat released can be used for heating the carbonizing means, saving the corresponding amount of heating energy. However, when adding oxygen or an oxygen mixture, care must be taken to ensure that it comes into contact with the pyrolysis gases only and not with the carbonizate in order to prevent burn-out thereof.

In general, the carbonizing means has an offgas-treating means for treating the offgases formed in operation in the carbonizing means connected to/positioned downstream of it.

It may be contemplated here in particular that the offgas-treating means comprises at least one thermal afterburning stage.

In a particularly preferred embodiment of the present invention, the offgas-treating means includes, in particular upstream of the thermal afterburning stage, at least one heat exchanger for cooling the offgases resulting from thermal afterburning.

The heat released can be used either for heating the carbonizing means and/or for heating the hereinbelow described oxidizing means for sulphur oxides.

Optionally, a drying means for drying the cooled offgases is positioned downstream of the thermal afterburning stage and the heat exchanger. The drying means in turn has a heating means for heating the dried offgases optionally positioned downstream of it. The drying of the cooled offgases can be effected either physically, for example by adsorption, or chemically, for example by reaction with concentrated sulphuric acid or phosphorous pentoxide, in which case drying the offgases chemically is preferred in the realm of the present invention.

It will be found particularly advantageous in the realm of the present invention when the offgas-treating means comprises an oxidizing means for preferably catalytically oxidizing the sulphur oxides, in particular sulphur dioxide, present in the offgases formed in operation in the carbonizing means, to form sulphur trioxide, preferably downstream of the thermal afterburning stage and the optional heat exchanger, drying means and/or heating means. It may be contemplated that the oxidizing means includes at least one oxidation catalyst, preferably vanadium and/or platinum based. It may further be contemplated that the oxidizing means includes a returning means for returning the sulphur trioxide into the sulphonating means. The returning of the sulphur trioxide into the sulphonating means is optionally effected via an interposed producing means for the sulphonating agent.

The sulphur trioxide formed can therefore be returned into the sulphonating means either directly or indirectly. Directly here is to be understood as meaning that gaseous sulphur trioxide is returned into the sulphonating means without intervening space or time. Indirectly in relation to the mode of returning the sulphur trioxide into the sulphonating means, however, is to be understood as meaning that the sulphur trioxide is first washed out of the gas stream, in particular with water or concentrated sulphuric acid in an interposed means, and that the sulphur trioxide is therefore returned into the sulphonating means in the form of thus generated concentrated sulphuric acid or oleum.

In one particular embodiment of the present invention, the oxidizing means includes a separating means for separating the sulphur trioxide from the other constituents of the offgases, in particular carbon oxides and/or water vapour and/or nitrogen oxides.

It may be contemplated here that downstream of the separating means for separating the sulphur trioxide from the other constituents of the offgases there is optionally provided a washer for washing the separated-off other constituents of the offgases.

The activating means downstream of the carbonization may generally be constructed as follows:

In general, the activating means is operable batchwise.

In a preferred embodiment of the present invention, the activating means forms a closed system; more particularly, the activating means is operable under inert conditions, in particular at the start of the activating and/or the start of the heating-up phase. Concerning the terms "closed system" and "inert conditions", reference can be made to the above observations.

The temperature of the activating means in operation can vary within wide limits. In general, the temperature of the activating means is variable in operation in the range from 300° C. to 1800° C., in particular 400° C. to 1500° C., preferably 500° C. to 1250° C. Nonetheless, for a particular application or on a one-off basis, it is possible to depart from the aforementioned values without thereby going outside the scope of the present invention. A decision to do so is within the ability or discretion of a person skilled in this field to decide.

More particularly, the temperature of the activating means in operation is steplessly and/or continuously variable. It may be contemplated that the activating means includes at least one heating means, in particular an electrically operated heating system.

In general, the activating means includes at least one feeding means for introducing, in particular by jetting and/or blowing, at least one activating gas, in particular water vapour and/or carbon dioxide and/or oxygen and/or ammonia. It may be contemplated in the context of the present invention that the feeding means includes at least one temperature control means for adjusting the activating gas (for example water vapour) to be introduced into the activating means.

In one preferred embodiment of the present invention, the feeding means includes at least one feeding means for introducing, in particular by jetting, spraying and/or blowing, water vapour, in particular in the form of a water vapour-inert gas mixture. The proportion of water vapour in the water vapour-inert gas mixture can vary within wide limits. In general, the proportion of water vapour in the water vapour-inert gas mixture is adjustable in the range from 5% to 70% by volume, in particular 10% to 50% by volume, preferably 15% to 40% by volume. Inert gases for the purposes of the present invention comprise gases or gaseous mixtures which have little if any reactivity under the conditions prevailing in the activating step, and/or the reactions of which have no or at least no negative influence on the processes taking place in activated carbon production; the inert gases used for the purposes of the present invention comprise in particular nitrogen and/or noble gases (for example argon), preferably nitrogen. Nonetheless, for a particular application or on a one-off basis, it is possible to depart from the aforementioned values without thereby going outside the scope of the present invention. A decision to do so is within the ability or discretion of a person skilled in this field to decide. It may be contemplated that the water vapour is introducible at temperatures of from 500° C. by jetting, spraying and/or blowing.

In a particularly preferred embodiment of the present invention, the feeding means includes at least one feeding means for introducing, in particular by jetting, spraying and/or blowing, carbon dioxide, in particular in the form of a carbon dioxide-inert gas mixture. With regard to the inert gases used, reference can be made to the above observations. It may be contemplated in this case that the carbon dioxide is introducible at temperatures of from 800° C. by jetting, spraying and/or blowing.

The burn-out behaviour of the crude activated carbon and thus its later porosity is chiefly influenced by the temperature during the activating step and, where appropriate, the $CO_2$ content in the activating means during the activating step.

In another particularly preferred embodiment of the present invention, the feeding means for introducing the activating gases is supplied by and/or connected to at least one stockkeeping receptacle which contains the at least one activating gas.

In general, the activating means has an offgas-treating means for treating the offgases formed in operation in the activating means connected to and/or positioned downstream of it. It will prove to be particularly advantageous when the offgas-treating means comprises at least one thermal afterburning stage. The offgases from the activating means vary with the activating gases used and comprise in general and at least essentially hydrogen and carbon oxides, in particular carbon monoxide.

It may be provided according to the present invention that the offgas-treating means includes, in particular upstream of the thermal afterburning stage, at least one washer for washing the offgases coming from the thermal afterburning stage.

After passing through the optional washer, the offgases which, owing to the thermal afterburning, consist overwhelmingly of carbon dioxide and water vapour are emitted. However, any excess offgases are supplied to the washer, i.e. offgases which cannot be further utilized in the operation. The overwhelming proportion of the offgases from the activating step is—as described hereinbelow—utilized as energy supplier in the individual operating stages of activated carbon manufacture.

In a very particularly preferred embodiment of the present invention, the offgases coming from the offgas-treating means, in particular from the thermal afterburning stage, downstream of the activating means are used for indirect, in particular, heating of the activating means and/or via a supply line for heating the stockkeeping receptacle containing the at least one activating gas, or the at least one activating gas and/or for heating the drying means, in particular for creating a fluidized bed.

For this purpose, the apparatus can be designed in particular such that the hot offgases at about 1000° C. coming from the thermal afterburning (TAB) of the offgases from the activating means are led on the outside along the activating means and heat the latter indirectly, so that at least about 10% to 20% of the activation energy requirements can be covered in this way. The hot offgases, which are then still at about 800° C., can subsequently be used for heating the activating gases, in particular the water vapour. Alternatively, the offgases of the thermal afterburning stage can also be used directly, i.e. without prior conducting along the activating means, for heating the activating gases. It is particularly preferred according to the present invention when the offgases, optionally after passing through the stockkeeping receptacle for the activating gases and/or the heating of the activating gases, are used for drying the starting materials needed for activated carbon production, in particular for creating a fluidized bed, in particular after they have been cooled down to about 150° C. by dilution with air. The cooled-down offgas can then be emitted via a washer, in which case—as already indicated above—excess, unused offgas can at any time be removed via a washer and subsequently emitted.

The drying stage upstream of the optional sulphonating means can be embodied in particular as follows:

In general, the drying means is operable in a fluidized bed. In particular, the drying means, in particular the fluidized bed thereof, is operable and/or heatable by means of offgases from the offgas-treating means, in particular from the thermal afterburning stage, in particular by means of offgases from the offgas-treating means for the activating means.

It can be contemplated in the realm of the present invention that the drying means is operable batchwise.

The temperatures at which the drying means is operable can vary within wide limits. In general, the drying means is operable at temperatures in the range from 100° C. to 400° C., in particular 100° C. to 200° C. Nonetheless, for a particular application or on a one-off basis, it is possible to depart from the aforementioned values without thereby going outside the scope of the present invention. A decision to do so is within the ability or discretion of a person skilled in this field to decide.

The sulphonating means placed downstream of the optional drying means can be constructed in particular as follows:

It can be contemplated in the realm of the present invention in particular that the optional sulphonating means is operable batchwise.

The temperatures at which the sulphonating means is operable can vary within wide limits. In general, the sulphonating means is operable at temperatures in the range from 25° C. to 400° C., in particular 50° C. to 300° C. Nonetheless, for a particular application or on a one-off basis, it is possible to depart from the aforementioned values without thereby going outside the scope of the present invention. A decision to do so is within the ability or discretion of a person skilled in this field to decide.

It will prove advantageous in the realm of the present invention when a classifying means for classifying the carbonizate coming from the carbonizing means is provided between the carbonizing means and the activating means. This permits classification of the resulting activated carbon according to particle size and hence according to use properties. Subsequent, purposive mixing of the individual classes can be used to conform the resulting activated carbon specifically to the requirements needed. This ensures that only carbonizate which is desired with regard to its particle size passes into the activating step.

The present invention further provides—in accordance with a second aspect of the present invention—a process for producing activated carbon, in particular by carbonization and subsequent activation of polymeric organic, preferably sulphonated, starting materials, the process comprising the following process steps:

(a) providing polymeric organic starting materials; then
(b) drying the starting materials if appropriate (i.e. in the case of undried or moist starting materials); then
(c) sulphonating and/or peptizing the possibly previously dried starting materials if appropriate (i.e. in the case of unsulphonated starting materials); then (d) carbonizing the possibly previously dried and/or sulphonated and/or peptized starting materials; then
(e) activating the previously carbonized starting materials; wherein the offgases from the carbonizing (d) and/or from the activating (e) are subjected to an offgas treatment.

It will be found to be advantageous in particular in the realm of the present invention for the polymeric organic starting material to be used to be in particular ion exchanger resins and their precursors, for example sulphonated ion exchanger resins and also their unsulphonated precursors and/or divinylbenzene-crosslinked polystyrenes, for example styrene-divinylbenzene copolymers, in sulphonated or unsulphonated form, preferably having a divinylbenzene content of for example 1% to 10% by weight of divinylbenzene, based on the copolymer.

The offgas treatment generally comprises at least one thermal afterburning stage.

It will be found advantageous in the realm of the present invention when the offgases from the carbonizing and the offgases from the activating are each subjected to an offgas treatment.

The offgases from the carbonizing and the offgases from the activating are preferably each subjected to a separate offgas treatment since they have different compositions and therefore the requirements for their treatment are different; for example, the offgases from the carbonizing have to be freed of sulphur oxides.

In general, the carbonizing is conducted in at least one rotary tube, in particular in at least one rotary tube oven. It will further be found advantageous in the realm of the present invention when the carbonizing is conducted in a closed system and/or the carbonizing is conducted under inert conditions. According to the present invention, the carbonizing may be operated continuously or quasi-continuously and/or the temperature during the carbonizing may be closed and/or open loop controlled continuously or steppedly. In one preferred embodiment of the present invention, the temperature during the carbonizing is closed and/or open loop controlled such that the carbonizing is conducted in two or more, in particular in at least two, preferably in four to eight, temperature zones having temperatures which each differ from the others, preferably having the temperature of the individual temperature stages each rising in the upstream direction. Alternatively, in the realm of the present invention, the carbonizing may be conducted in a temperature gradient, preferably having a rising temperature profile in the upstream direction.

The temperature during the carbonizing can vary within wide limits. In general, the temperature during the carbonizing is closed and/or open loop controlled in the range from 20° C. to 1200° C., in particular 30° C. to 1100° C., preferably 50° C. to 1000° C. Nonetheless, for a particular application or on a one-off basis, it is possible to depart from the aforementioned values without thereby going outside the scope of the present invention. A decision to do so is within the ability or discretion of a person skilled in this field to decide. It may be contemplated in the realm of the present invention that a first temperature zone, preferably situated at the inlet or in the process flow direction at the upstream end of the carbonizing (means), is adjusted in the range from 50° C. to 500° C., in particular 200° C. to 450° C. It may further be contemplated that a further temperature zone, preferably situated at the outlet or downstream end of the carbonizing (means), is adjusted in the range from 800° C. to 1200° C., in particular 850° C. to 950° C. In these cases too the recited values only mark the customary ranges hitherto preferred. However, for a particular application or on a one-off basis, it is readily possible to depart from the aforementioned values without thereby going outside the scope of the present invention. A decision to do so is within the ability or discretion of a person skilled in this field to decide.

The carbonizing is generally subdivided into at least two part-steps. It may be contemplated that a first, preferably upstream, part-step is conducted in a heated vibrating chute and a second part-step, preferably conducted downstream of the first section, is conducted in a rotary tube, preferably in a rotary tube oven, in particular having a rising temperature profile or temperature gradient in the process flow direction.

According to the present invention, the first part-step may be conducted with a constant temperature or with a temperature profile or temperature gradient rising in the process flow direction and/or the second part-step may be conducted with a temperature profile or temperature gradient rising in the process flow direction. Furthermore, in the realm of the present invention, the temperature in the first carbonizing part-step in the process flow direction may be closed loop controlled continuously or steppedly. The temperatures in the first carbonizing part-step in the process flow direction may vary within wide limits. In general, the temperature in the first carbonizing part-step in the process flow direction is closed loop controlled continuously or steppedly in the range from 50° C. to 500° C., preferably 200° C. to 450° C. Nonetheless, for a particular application or on a one-off basis, it is possible to depart from the aforementioned values without thereby going outside the scope of the present invention. A decision to do so is within the ability or discretion of a person skilled in this field to decide.

Furthermore, in the realm of the present invention, the temperature in the second carbonizing part-step in the process flow direction may be closed loop controlled to be rising, in particular steppedly or steplessly, in particular in two or more temperature zones or with a temperature gradient, in the process flow direction. The temperature in the second carbonizing part-step in the process flow direction may vary within wide limits. In general, the temperature in the second carbonizing part-step in the process flow direction is closed loop controlled to rise in the process flow direction in the range from 300° C. to 1200° C., preferably from 350° C. to 950° C. Nonetheless, for a particular application or on a one-off basis, it is possible to depart from the aforementioned values without thereby going outside the scope of the present invention. A decision to do so is within the ability or discretion of a person skilled in this field to decide.

In one particular embodiment of the present invention, water vapour, in particular in the form of a water vapour-inert gas mixture, is injected by spraying or jetting during the carbonizing, preferably at the inlet or in the process flow direction at the upstream end of the carbonizing (means), in particular at the inlet or in the process flow direction at the upstream end of the second section of the carbonizing means. The proportion of water vapour in the water vapour-inert gas mixture can vary within wide limits. Generally, the proportion of water vapour in the water vapour-inert gas mixture is adjusted in the range from 1% to 30% by volume, in particular 2% to 20% by volume, preferably 5% to 15% by volume. Nonetheless, for a particular application or on a one-off basis, it is possible to depart from the aforementioned values without thereby going outside the scope of the present invention. A decision to do so is within the ability or discretion of a person skilled in this field to decide.

It will further be found advantageous in the realm of the present invention when oxygen, in particular in the form of an oxygen mixture with at least one further gas, preferably in the form of air, is introduced or injected during the carbonizing, preferably at the outlet or in the process flow direction at the downstream end of the carbonizing (means). The introduced or injected volume stream of oxygen or of an oxygen mixture can vary within wide limits. In general, the introduced or injected volume stream of oxygen, in particular in the form of an oxygen mixture with at least one further gas, preferably in the form of air, is adjusted in the range from 10 to 500 l/min, in particular 25 to 250 l/min, preferably 50 to 100 l/min. Nonetheless, for a particular application or on a one-off basis, it is possible to depart from the aforementioned values without thereby going outside the scope of the present invention. A decision to do so is within the ability or discretion of a person skilled in this field to decide.

In general, the carbonizing is followed by treating the offgases formed in the carbonizing. It may be contemplated here that the offgas treatment comprises at least one thermal afterburning stage. In a particularly preferred embodiment of the present invention, the offgas treatment is followed, in particular at a point upstream of the thermal afterburning stage, by the offgases resulting from the thermal afterburning stage being cooled, in particular by means of a heat exchanger. Optionally, the cooling of the offgases is followed by drying of the cooled offgases. In turn, the drying of the offgases may optionally be followed by heating of the dried offgases.

In a particularly preferred embodiment of the present invention, the offgas treatment comprises an oxidation, preferably a catalytic oxidation, of the sulphur oxides, in particular sulphur dioxide, present in the offgases formed in the carbonizing, to form sulphur trioxide, preferably downstream of the thermal afterburning stage and the optional cooling, drying and/or heating. It may be contemplated that the oxidation is conducted by means and/or in the presence of at least one oxidation catalyst, preferably vanadium and/or platinum based. It may be further contemplated that the sulphur trioxide generated in the oxidation is returned into the sulphonation and/or peptization. Optionally the sulphur trioxide generated in the oxidation is returned into the sulphonation and/or peptization after an interposed process step for producing the sulphonating agent.

It will further prove particularly advantageous in the realm of the present invention when the sulphur trioxide generated in the oxidation is separated from the other constituents of the offgases, in particular carbon oxides and/or water vapour and/or nitrogen oxides. It may be contemplated here that the separating is optionally followed by washing of the separated-off other constituents of the offgases.

The carbonizing is then followed, optionally after an interposed classifying step for the carbonizate, by activating the previously produced carbonizate. In general, the activating is conducted batchwise.

It will further be found to be advantageous according to the present invention when the activating is conducted in a closed system and/or when the activating is conducted under inert conditions, in particular at the start of the activating and/or at the start of the heating-up phase.

The temperature during activating can vary within wide limits. In general, the temperature during activating is set in the range from 300° C. to 1800° C., in particular 400° C. to 1500° C., preferably 500° C. to 1250° C. Nonetheless, for a particular application or on a one-off basis, it is possible to depart from the aforementioned values without thereby going outside the scope of the present invention. A decision to do so is within the ability or discretion of a person skilled in this field to decide.

It may be contemplated in this connection that the temperature during activating is set steplessly and/or continuously, preferably by means of a heating means, in particular an electrically operated heating system.

In a particularly preferred embodiment of the present invention, the activating comprises introducing, in particular by jetting and/or blowing, at least one activating gas, in particular water vapour and/or carbon dioxide and/or oxygen and/or ammonia.

It may be contemplated in the realm of the present invention that the activating gas introduced into the activating step is heated to a defined temperature.

When two or more different activating gases are used, these may be introduced into the activating step at the same time or at different times, in which case introducing at different times is preferable in the realm of the present invention. Similarly, the activating gases can be introduced at like or different temperatures.

According to the present invention, the activating comprises introducing, in particular by jetting, spraying and blowing, at least water vapour, in particular in the form of a water vapour-inert gas mixture, as activating gas.

The proportion of water vapour in the water vapour-inert gas mixture can vary within wide limits. In general, the proportion of water vapour in the water vapour-inert gas mixture is set in the range from 5% to 70% by volume, in particular 10% to 50% by volume, preferably 15% to 40% by volume. Nonetheless, for a particular application or on a one-off basis, it is possible to depart from the aforementioned values without thereby going outside the scope of the present invention. A decision to do so is within the ability or discretion of a person skilled in this field to decide. It may be contemplated in this connection that the water vapour is introduced at temperatures from 500° C. by jetting, spraying and/or blowing during the activating.

It will likewise prove advantageous in the realm of the present invention when the activating comprises introducing carbon dioxide, particularly in the form of a carbon dioxide-inert gas mixture, as an activating gas, in particular in addition to water vapour being used as activating gas, in particular by jetting, spraying and/or blowing. It may be contemplated that the carbon dioxide is introduced at temperatures from 800° C. by jetting, spraying and/or blowing.

As already noted in the observations concerning the apparatus of the present invention, the temperatures and the carbon dioxide content during the activating influence the burn-out behaviour of the material to be activated and thus the material properties of the resulting activated carbon.

In one particular embodiment of the present invention, the at least one activating gas is fed into the activating step from a stockkeeping receptacle via a feeding means.

In general, the activating is followed by a treatment being conducted on the offgases formed in the activating. It may be contemplated in this connection that the offgas treatment comprises at least one thermal afterburning stage.

According to the present invention, the thermal afterburning stage may be followed by a wash being conducted of the offgases from the thermal afterburning stage. After passing through the washer, the offgases which, owing to the thermal afterburning, consist overwhelmingly of carbon dioxide and water vapour, are emitted. However, only excess offgases are routed to the wash directly, the overwhelming portion being utilized as an energy supplier in the various operations of activated carbon manufacture.

In a particularly preferred embodiment of the present invention, the offgases coming from the offgas treatment (i.e. offgas treatment of the offgases coming from the activating), in particular from the thermal afterburning, are used for indirect, in particular, heating for the activating (means) and/or for heating the at least one activating gas and/or for drying, in particular for creating a fluidized bed. For further details concerning using the offgases from the activating, in particular after passing through the thermal afterburning, reference can be made to the above elucidations concerning the apparatus of the present invention.

As observed above, a drying step (a) is conducted in the case of undried/moist starting materials before the actual production of activated carbon. According to the present invention, the drying can be conducted in a fluidized bed; preferably, the drying, in particular the fluidized bed thereof, can be operated by means of offgases coming from the offgas treatment (i.e. the offgas treatment of the offgases from the activating), in particular from the thermal afterburning. In particular, in the realm of the present invention, the drying can be operated batchwise. The temperatures in relation to the drying step can vary within wide limits. In general, the drying is operated at temperatures in the range from 100° C. to 400° C., in particular 100° C. to 200° C. Nonetheless, for a particular application or on a one-off basis, it is possible to depart from the aforementioned values without thereby going outside the scope of the present invention. A decision to do so is within the ability or discretion of a person skilled in this field to decide.

As observed above, a process step of sulphonating and/or peptizing is conducted before the carbonizing in the case of unsulphonated starting materials. This process step of sulphonating and/or peptizing comprises the actual sulphonation (i.e. the introduction of sulphonic acid groups) and also, optionally, the peptization (i.e. the dissolving out of monomeric, dimeric and oligomeric units remaining in the starting material and the deposition of said units on the outer surface of the particles of the starting material). In particular, in the realm of the present invention, the sulphonating and/or peptizing can be operated batchwise.

The sulphonating/peptizing temperature can vary within wide limits. In general, the sulphonating/peptizing is operated at temperatures in the range from 25° C. to 400° C., in particular 50° C. to 300° C. Nonetheless, for a particular application or on a one-off basis, it is possible to depart from the aforementioned values without thereby going outside the scope of the present invention. A decision to do so is within the ability or discretion of a person skilled in this field to decide.

In a particularly preferred embodiment of the present invention, a process step of classifying the carbonizate coming from the carbonizing can also be conducted between the carbonizing step and the activating step.

For further details concerning the process of the present invention, reference can be made to the above observations concerning the apparatus of the present invention, which hold mutatis mutandis in relation to the process of the present invention.

The apparatus of the present invention and also the process of the present invention have a number of advantages over the prior art:

The oxidation of the sulphur-containing compounds to sulphur trioxide and the sulphur trioxide being returned into the sulphonation substantially avoids the emission of sulphur-containing offgases which would otherwise have to be inconveniently and cost-intensively cleaned/purified.

A large proportion of the sulphonating agent used can be recovered, so that only a small proportion of the sulphonating agent is actually consumed and has to be replaced.

Recovering the sulphonating agent also dramatically reduces the total amount of all offgases generated, in particular the corrosive acidic offgases.

Thermal afterburning of the offgases formed in the carbonizing/activating ensures that the offgases, after removal of the sulphur-containing compounds, consist almost exclusively of the innocuous combustion residues carbon dioxide and water vapour.

Afterburning generates heat whereby the energy requirements of the activated carbon production process can be distinctly reduced; for instance, the energy requirements of the activating step can be reduced by at least 10% to 20% by the thermal afterburning of the offgases formed.

Hot offgases from the thermal afterburning, moreover, can also be used for heating the activating gases and/or for drying the starting materials used for the activated carbon production.

Classifying the crude activated carbon before activation makes it possible to separate or else to specifically mix the individual classes, so that the resulting activated carbon can be optimally conformed to the intended end-use.

The apparatus of the present invention and the process of the present invention make it possible to maintain the $SO_2$ emission during carbonization at such a constant level as to allow a sulphur trioxide production process to be carried out and hence for the sulphonating agent to be recovered.

The sole FIGURE is a schematic and exemplary depiction of a typical, preferred embodiment of the inventive apparatus 1 and of the inventive process sequence:

As the FIGURE shows, when nondried/moist starting material is used, a drying operation, preferably in a fluidized bed, is optionally initially carried out in 2, which in the case of unsulphonated starting materials is then followed optionally at 3 by a sulphonation and/or peptization. The dried and sulphonated/peptized starting material, for example based on sulphonated styrene-divinylbenzene polymers, for example in the form of so-called sulphonated ion exchanger resins of the gel type or of the macroporous type, is then subsequently subjected to carbonization at 4, whereafter the carbonizate resulting from this stage is subjected to activation at 5, resulting in the desired end product (i.e. activated carbon). As the FIGURE further shows, the acidic, in particular, offgases, coming from the carbonization 4 are initially subjected, at 4A, to thermal afterburning (TAB) and thereafter—optionally after cooling, drying and renewed heating of these gases—at 4B to a catalytic oxidation, in particular in the presence of vanadium pentoxide as oxidation catalyst, so that sulphur dioxide $SO_2$ present in the offgas is converted to sulphur trioxide $SO_2$, which can be returned, via 4C, back into the sulphonation 3, in particular in the form of concentrated sulphuric acid/oleum. The remaining offgases from the catalytic oxidation 4B, however, are then emitted, optionally after a further downstream wash 4D, these offgases comprising essentially carbon dioxide $CO_2$, water vapour $H_2O$ and only very minor amounts of nitrogen oxides $NO_x$ and sulphur oxides $SO_x$.

The offgases from the activation 5, in particular hydrogen $H_2$ and carbon monoxide CO, are similarly subjected to thermal afterburning (TAB) 5C, and the still hot offgases coming from the thermal afterburning can be used firstly to co-heat the activating means 5, secondly to heat up the activating gases, or the relevant receptacle for the activating gases, in particular water vapour, at 5B, in which case the heated activating gases, in particular water vapour, are then supplied to the activating step via 5A, and finally also to supply the requisite heat and the fluidized bed for the drying stage 2. Any unused offgases from thermal afterburning (TAB) 5C can then be emitted, optionally after a washer 5D, as offgases, in particular consisting mainly of carbon dioxide $CO_2$ and water vapour $H_2O$ etc.

In a typical embodiment of the present invention, the apparatus of the present invention or the process of the present invention can be executed as follows:

The starting material, for example styrene-divinylbenzene copolymers, in particular ion exchangers of the gel type or of the macroporous type, are—if present in nondried/moist form—subjected to drying in a first stage, said drying of the starting material being preferably effected in a fluidized bed, preferably by utilizing rejected heat from the activating step. The drying is typically carried out batchwise/discontinuously (for example 1 m$^3$ of starting material per batch).

Unsulphonated starting materials are subjected in a second stage, downstream of the drying stage, to a sulphonation/peptization. For this purpose, the starting polymers or to be more precise ion exchangers are contacted with a suitable sulphonating agent, in particular concentrated sulphuric acid/oleum (for example 15% oleum), in particular at temperatures of 100° C. to 400° C., preferably 150 to 250° C. Depending on the desired pore system, different quantitative ratios of sulphonating agent can be used and, for example, reacted according to a temperature characteristic, selectable by a person skilled in the art, until the starting material has been sulphonated and is present in free-flowing form. This stage provides not just a sulphonation but generally also a so-called peptization, i.e. monomer, dimer and oligomer residues are dissolved out of the starting materials and subsequently redeposited on the surface of the particles, these redepositions resulting in the course of the subsequent carbonization in a very hard and hence abrasion-resistant pseudographite layer being formed on the surface of the particles.

A subsequent, third, stage of the process then involves the dry and sulphonated starting material being carbonized/pyrolyzed, preferably continuously or quasi-continuously, in particular in a closed system. Carbonization is typically carried out under inert reaction conditions. The material can typically be discharged onto a heatable vibrating chute, customarily under inert gas atmosphere, in which case the material can be heated to 350° C., for example, in the course of 60 minutes for example. This vibrating chute then feeds into a likewise continuously or quasi-continuously operated rotary tube oven having a temperature of typically 400° C. at the inlet side. In the course of transport in the rotary tube, the material is then typically heated to, for example, 900° C. via six to eight heating zones. Preference is given to the simultaneous addition of water vapour, preferably of a corresponding nitrogen-water vapour mixture (for example 10% to 30% by volume of water vapour), from the oven inlet side and the addition of air/oxygen (for example 50 to 100 l/min) from the oven outlet side in order that the combustion of resulting pyrolysis gases in the reaction tube may be made possible. This can be used to achieve several positive effects. First, condensing of pyrolysis gases in the base pore system of the starting material is substantially prevented, and secondly the combustion in the reaction tube can be used to utilize the heat content and the input of electric power into the oven-heating system can be minimized. After carbonization/pyrolysis is concluded, the material is typically accessible and has an internal surface area (BET) of for example 400 to 800 m$^2$/g. It is preferable when the particle shape is spherical, in accordance with the starting materials.

A downstream, fourth stage then involves the initially produced carbonizate being activated. In the activating step, the material, preferably after prior classification, is filled in narrow particle size fractions into a rotary tube oven having internals and is heated under an inert atmosphere to about 960° C. for example, while the atmosphere can have water vapour added to it (for example 20% to 30% by volume), preferably in the form of a nitrogen/water vapour mixture, from about 600° C. for example. Depending on the degree of activation desired and depending on the pore system desired, the atmosphere can be admixed with carbon dioxide $CO_2$ from about 900° C. for example, and/or the temperature can be varied, for example to influence the burn-out behaviour. The gases, in particular hydrogen $H_2$ and carbon monoxide CO, formed in the activating step can advantageously be used for indirect heating of the activating pipe. As a result, about 20% of the total energy requirements of the apparatus can be coupled out of the process.

As far as the offgas treatment is concerned, the offgases coming from the carbonization/pyrolysis can initially be afterburned in a thermal afterburning stage (TAB), in particular via excess air, to oxidize all organic constituents; subsequently, the $SO_2$-rich offgas is advantageously directed into a heat exchanger and cooled, in order that it may be dehumidified in a gas-drying stage, by means of sulphuric acid, and after subsequent heating, for example to temperatures of about 480° C., the gas can be led via a plurality of stages to an oxidation catalyst (for example vanadium-based oxidation catalyst, for example vanadium pentoxide) until the sulphur dioxide $SO_2$ has been oxidized to sulphur trioxide $SO_2$. After all the $SO_2$ has been oxidized to $SO_2$, the $SO_2$-containing offgas is typically cooled again and the $SO_2$ is washed out by means of concentrated sulphuric acid, so that the $SO_2$ can be returned into the sulphonating step. Thus, a complete recycling circuit is provided for sulphonating agents and there is no need for costly and inconvenient disposal. In order that the design may be economically and ecologically realizable, it is of advantage when the quantities of offgas generated are relatively constant, which can be achieved by the $SO_2$-relevant process steps, in particular the carbonization/pyrolysis, being made continuous/quasicontinuous and the $SO_2$ emission being maintained approximately constant, i.e. without spikes in the $SO_2$ emission.

The treatment of the offgases from the activating step can be carried out in the manner previously described (i.e. thermal afterburning and use of the offgases coming from the thermal afterburning for heating the activating gas, in particular water vapour, and/or for indirect heating of the activating oven and/or for use in fluidized bed drying).

The present invention finally also provides—in accordance with a third aspect of the present invention—for the use of the apparatus of the present invention, as previously described, for producing activated carbon. As previously described, the production of activated carbon in the course of the use according to the present invention is effected by carbonization and subsequent activation of polymeric organic, preferably sulphonated, starting materials. For further details concerning the use according to the present invention, reference can be made to the above observations concerning the apparatus of the present invention and the process of the present invention, which apply mutatis mutandis to the use according to the present invention.

Further refinements, modifications, variations and also advantages of the present invention will become readily apparent to and realizable by the ordinarily skilled after reading the description without their having to depart from the realm of the present invention.

The invention claimed is:

1. An apparatus for producing activated carbon by carbonization and subsequent activation of polymeric organic sulphonated starting materials, the apparatus comprising:
optionally a drying means for drying the starting materials,
optionally a sulphonating means for sulphonating and/or peptizing the optionally previously dried starting materials downstream of the optional drying means,
a carbonizing means for carbonizing the optionally previously dried and/or sulphonated and/or peptized starting materials downstream of the optional drying means and/or the optional sulphonating means, wherein the temperature of the carbonizing means is adjustable in operation such that at least two temperature zones having the temperature of the individual temperature stages each rising in the downstream direction are present or else a temperature gradient having a rising temperature profile in the downstream direction is present,
downstream of the carbonizing means, an activating means for activating the starting materials previously carbonized in the carbonizing means;
wherein the carbonizing means has an offgas-treating means for treating the offgases formed in operation in the carbonizing means connected to and/or positioned downstream of it,
wherein the offgas-treating means comprises at least one thermal afterburning stage;
wherein the offgas-treating means for treating the offgases formed from the carbonizing means includes at least one heat exchanger for cooling the offgases resulting from thermal afterburning, followed by a drying means for drying the cooled offgases and in turn followed by a heating means for heating the dried offgases; and
wherein the activating means has an offgas-treating means for treating the offgases formed in operation in the activating means connected to and/or positioned downstream of it,
wherein the offgas-treating means comprises at least one thermal afterburning stage, and wherein the offgases coming from the offgas-treating means of the activating means are used for heating of the activating means and/or for heating a stockkeeping receptacle containing at least one activating gas and/or for heating the optional drying means.

2. The apparatus according to claim 1, wherein the carbonizing means comprises at least one rotary tube and wherein the carbonizing means forms a closed system and is operable under inert conditions in a continuous or quasi-continuous manner.

3. The apparatus according to claim 1, wherein the temperature of the carbonizing means is continuously or steppedly adjustable in operation.

4. The apparatus according to claim 1, wherein the temperature of the carbonizing means is adjustable in operation in the range from 20° C. to 1200° C., wherein a first temperature zone situated at the inlet or in the process flow direction at the upstream end of the carbonizing means, is adjustable in operation in the range from 50° C. to 500° C. and wherein a further temperature zone situated at the outlet or downstream end of the carbonizing means, is adjustable in operation in the range from 800° C. to 1200° C.

5. The apparatus according to claim 1, wherein the carbonizing means is subdivided into at least two sections, wherein a first section disposed upstream is formed by a heatable vibrating chute and a second section disposed downstream of the first section is formed by a rotary tube or a rotary tube oven having a rising temperature profile or temperature gradient in the process flow direction in the operating state.

6. The apparatus according to claim 5, wherein the first section is constructed to be settable to a constant temperature or is constructed to be adjustable to a rising temperature profile or temperature gradient in the process flow direction and wherein the second section is constructed to be adjustable to a rising temperature profile or temperature gradient in the process flow direction.

7. The apparatus according to claim 1, wherein the carbonizing means includes, at the inlet or in the process flow direction at the upstream end of the carbonizing means, an injective spraying or jetting means for injective spraying or jetting of water vapour.

8. The apparatus according to claim 1, wherein the activating means (5) is operable batchwise and forms a closed system and wherein the activating means is operable under inert conditions, wherein the temperature of the activating means is variable in operation in the range from 300° C. to 1800° C.

9. The apparatus according to claim 1, wherein the activating means includes at least one feeding means for introducing at least one activating gas, wherein the feeding means includes at least one temperature control means for adjusting the activating gas to be introduced into the activating means and wherein the feeding means is supplied by and/or connected to at least one stockkeeping receptacle which contains the at least one activating gas.

10. The apparatus according to claim 1, wherein the drying means is operable in a fluidized bed and is operable and/or heatable by means of offgases coming from the offgas-treating means of the activating means.

11. The apparatus according to claim 1, wherein the sulphonating means is operable batchwise and wherein the sulphonating means is operable at temperatures in the range from 25° C. to 400° C.

* * * * *